United States Patent [19]

Walker

[11] Patent Number: 4,735,135
[45] Date of Patent: Apr. 5, 1988

[54] UTENSIL ASSEMBLY FOR COOKING VESSELS

[76] Inventor: Lynn F. Walker, 6975 Alamo Way, La Mesa, Calif. 92041

[21] Appl. No.: 929,062

[22] Filed: Nov. 7, 1986

[51] Int. Cl.4 .............................................. A47J 37/12
[52] U.S. Cl. ......................................... 99/424; 99/415; 99/418; 99/419; 99/421 V
[58] Field of Search ................... 99/424, 339, 340, 410, 99/412, 413, 415, 416, 418, 421 R, 421 V, 448, 371; 126/363, 369, 25 R; 211/125, 181

[56] References Cited

U.S. PATENT DOCUMENTS

| | | | |
|---|---|---|---|
| 1,272,222 | 7/1918 | Clayton | 99/418 |
| 1,344,915 | 6/1920 | Love | 99/419 X |
| 2,052,505 | 8/1936 | Vetrosky | 99/419 |
| 3,026,400 | 3/1962 | Van Scirer | 99/419 |
| 3,053,169 | 9/1962 | Rappaport | 99/421 V |
| 3,285,159 | 11/1966 | Greene | 99/418 X |
| 3,931,758 | 1/1976 | Blake | 99/419 |
| 4,013,869 | 3/1977 | Orts | 99/415 X |
| 4,450,759 | 5/1984 | Steibel | 99/419 |

FOREIGN PATENT DOCUMENTS 12915 12/1910 France ............................. 99/415

Primary Examiner—Louis K. Rimrodt
Assistant Examiner—J. L. Olds
Attorney, Agent, or Firm—Bernard L. Kleinke

[57] ABSTRACT

A utensil assembly and kit including same, for cooking vessels used for preparing and supporting comestibles above the bottom of the cooking vessel and away from its inner walls. The utensil kit comprises a base supported above the bottom of the cooking vessel; a plurality of support attachments separately detachably interchangeably mountable on the base for supporting selected comestible products; and releasable latch mechanism having two parts, one part is disposed on the base, and the other part is disposed on each of the support attachments for engaging the base.

25 Claims, 2 Drawing Sheets

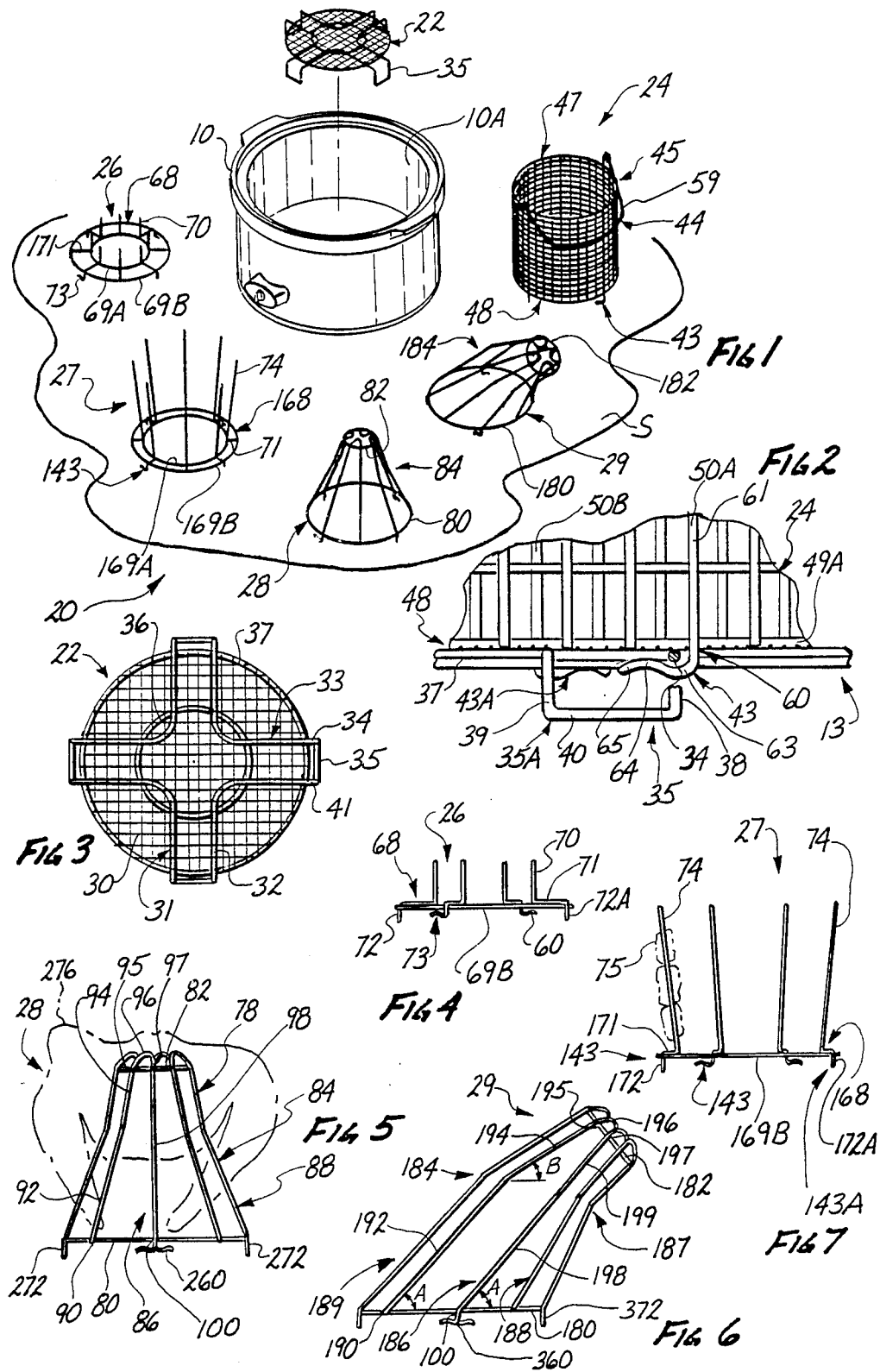

UTENSIL ASSEMBLY FOR COOKING VESSELS

TECHNICAL FIELD

The present invention relates in general to the art of cooking, and pertains more particularly to utensil assemblies for slow cooking vessels.

BACKGROUND ART

The art of cooking foods is a very old art and many techniques for the application of heat to comestibles or food products for cooking thereof have been developed over the years. One development that has been popular in recent years is that of the slow cooker available from certain manufacturers under the trademark "Crockpot".

This technique of cooking utilizes a heavy earthenware container or pot, which is heated with a controllable electrical heating element for the application of a heat at a moderate temperature to comestibles contained in the container for cooking over a long period of time, such as from eight to twelve hours.

This cooking technique enables a working person to load the food in the cooker prior to leaving for work in the morning, turning the cooker on, and having hot food ready for the evening meal at the end of the day.

One of the major drawbacks to the slow cooking process is that food tends to lose its flavor when cooked by this approach. This cooking process may utilize some liquid within the cooker, and frequently further liquid is accumulated from grease from the cooked food products, such as meat, being prepared. Foods cooked by this process tend to absorb the grease, and thus have less desirable flavor than foods cooked by other traditional processes.

In an attempt to overcome this problem, various racks have been designed to support above the liquid at the bottom of the cooking vessel, certain types of comestible products, to avoid the unwanted and undesirable absorption of grease or other liquids.

For instance, the conventional meat racks are formed of continuous lengths of wire having a support portion to hold the meat, and several legs to elevate the meat racks above the bottom of the cooking vessel. The support portions however, are designed to hold large chunks of meat, and comprise wide openings to allow the melting fat or grease to drip through, and to heat the bottom part of the meat.

Such meat racks are not designed to hold a variety of comestibles, of different sizes and shapes. For instance, they are not adapted to support small food items like cherry tomatos, which pass through the wide openings in the rack, and onto the bottom of the cooking vessel.

A special problem occurs when a large, irregularly shaped comestible, such as a chicken or other fowl, is to be prepared in the cooking vessel. Such comestible is difficult to support on the conventional wire racks, in that its center of gravity is off center, and therefore it can slip off of the support, and come in contact with the walls of the cooking vessel.

The conventional cooking vessels generally fall into two categories. Smaller vessels that are tall and slender; and larger vessels that are low and wide. Wherefore, the conventional wire racks are not adapted to fit into a variety of different sizes of cooking vessels.

Another disadvantage of the conventional wire racks, is that an inadvertent thrust to the cooking vessel would displace the food items and cause them to touch the walls or the bottom of the cooking vessel. In which case, the part of the food items, so displaced in contact with the cooking vessel would become overcooked, soft, mushy, greasy and/or less desirable to consume.

Therefore, it would be desirable to have a utensil assembly for cooking vessels which addresses the above problems of the prior art and which provides adequate and inexpensive solutions thereto.

Such utensil assembly would allow the preparation of a wide variety of comestible products, including smaller sized ingredients as well as irregularly shaped products, such as poultry. It would also be adapted to fit into a variety of different sizes of cooking vessels.

It would also be desirable to have a utensil assembly which would securely hold the comestibles in place without allowing them to come in contact with the inner walls or bottom of the cooking vessel. This is true not only for smaller sized ingredients such as sliced vegetables or cherry tomatoes, but also for large irregularly shaped comestibles such as poultry items.

Such utensil assembly would also enhance the free flow of heated air within the cooking vessel, and would permit a uniform cooking of the comestibles. It would further be relatively inexpensive and easy to manufacture.

DISCLOSURE OF INVENTION

Therefore, it is the principal object of the present invention to provide a new and improved utensil kit for cooking vessels, which is universally adaptable to support a wide variety of different comestibles within a cooking vessel, and which securely holds them in a desired position away from the walls of the vessel.

It is another object of the present invention to provide a new and improved utensil kit for cooking vessels which is adaptable to fit into a variety of different sizes of cooking vessels, which would enhance the free flow of heated air within the vessels, and which is relatively easy and inexpensive to manufacture.

Briefly, the above and further objects of the present invention are realized by providing a utensil assembly for cooking vessels used for preparing and supporting a wide variety of different comestibles above the bottom of the vessel and away from its inner walls in a secure manner.

The utensil assembly and kit including same, includes a base supported above the bottom of a cooking vessel, and a plurality of interchangeable support attachments separately detachably mountable on the base, each for supporting a different comestible product. A latch device is disposed on each of the support attachments to releasably engage the base, and to enable the comestibles to be firmly and securely held in a desired position away from the inside walls of the cooking vessel.

The inventive utensil kit provides a universal support for a wide variety of comestibles, such as meat, shish kebab, small comestible items and various sizes of poultry items. It would also be adaptable to fit into a variety of different sizes of cooking vessels.

A latch device is used to securely lock the parts of the assembly together, so that it does not become disassembled inadvertently, thereby causing parts of the comestibles to touch the cooking vessel.

The special design of the inventive utensil kit would enable it to enhance the free flow of heated air within the cooking vessel, and would further make it relatively easy and inexpensive to manufacture.

BRIEF DESCRIPTION OF DRAWINGS

The above mentioned and other objects and features of this invention and the manner of attaining them will become apparent, and the invention itself will be best understood by reference to the following description of an embodiment of the invention in conjunction with the accompany drawings, wherein:

FIG. 1 is a pictorial view of a cooking utensil kit, including a disassembled utensil assembly, which is constructed in accordance with the present, and which is shown in connection with a slow cooking vessel;

FIG. 2 is a fragmentary, enlarged elevational view of the latch mechanism on the utensil assembly of FIG. 1, which assembly is shown in an assembled form;

FIG. 3 is an enlarged top plan view of the base member of FIG. 1;

FIG. 4 is an enlarged side elevational view of the meat holder support attachment of FIG. 1;

FIG. 5 is an enlarged side elevational view of the poultry support attachment of FIG. 1, as used in tall, narrow slow cooking vessels (not shown) as indicated in fragmentary broken lines;

FIG. 6 is an enlarged side elevational view of another poultry support attachment of FIG. 1, as used in a short, wide slow cooking vessel as shown in FIG. 1;

FIG. 7 is an enlarged side elevational view of the shish kebab, support attachment holding small comestible items in broken lines;

BEST MODE FOR CARRYING OUT THE INVENTION

Figure 8:
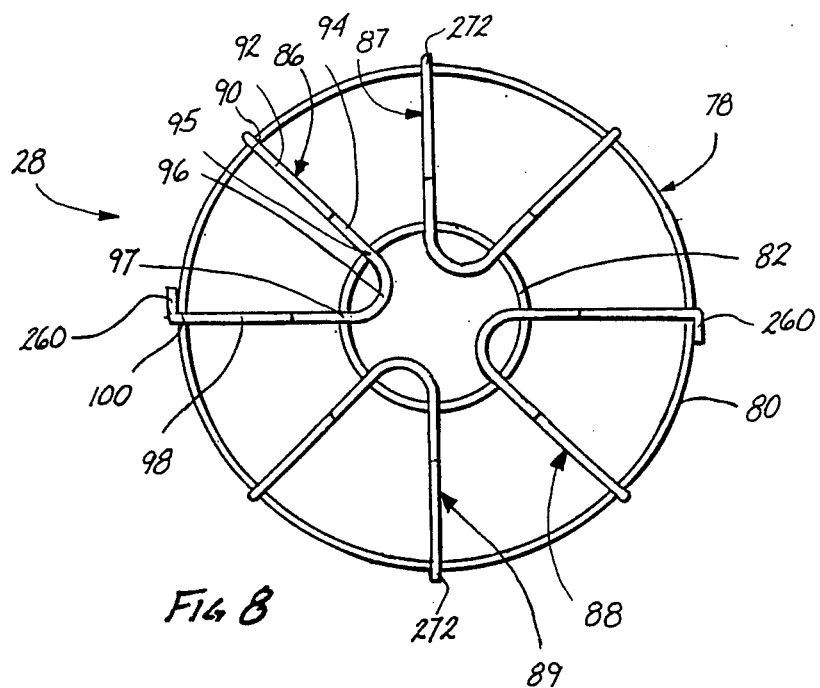
FIG. 8 is a greatly enlarged top plan view of the poultry support attachment of FIG. 5.

Referring now to the drawings, and more particularly to FIG. 1, there is illustrated a cooking utensil kit 20, constructed in accordance with the present invention, for use within a slow cooking vessel 10.

The kit 20 generally comprises a base 22 designed to receive and to support from below, any one of a group of interchangeable support attachments.

The support attachments include a basket attachment 24, a meat holder attachment 26, a shish kebab attachment 27, an upright poultry attachment 28 for use in a tall slow cooking vessel (not shown) and a leaning poultry attachment 29 for use in the short slow cooking vessel 10.

In use, as shown in FIG. 2, one of the attachments, such as the basket attachment 24, is selected, and then placed on top of the base 22, to form a comestible supporting utensil assembly 13 (FIG. 2). As hereinafter described in greater detail, the attachment 24 is releasably fixed to the base 22, to enable comestibles, such as sliced vegetables (not shown), to be placed securely within the hollow interior of the basket attachment 24. Once the comestibles are placed in the assembly 13, the assembly 13 is placed within the cooking compartment 10A of the vessel 10 to prepare the comestibles.

Therefore, each attachment supports a different type or kind of food products. Thus, the kit 20 is universal, and enables a variety of different food products to be securely supported above the bottom wall of a cooking vessel.

As shown in FIG. 3, the base 22 includes a generally circular planar perforate grid member 30 supported on a wire frame 31. The wire frame 31 in turn is made of a continuous wire member 32 formed into a crossconfiguration or cruciform, having four like arms, such as the arm 33, extending radially horizontally outwardly to short horizontal rod portions 34 and 41, and terminating in a downwardly depending U-shaped leg portions, such as the leg portion 35 bent transversely at right angles from the short horizontal rod portions 34 and 41. The frame 31 is rigidified by a pair of concentric inner and outer rings 36 and 37, respectively.

The perforate grid member 30 is preferably formed of a planar sheet of metal fabric, in a circular configuration contoured by the outer ring 37, and having relatively small interstitial openings to enable the base 22 to support small comestible items thereon.

The arms 33, the pair of rings 36 and 37, and the grid 30 may be made of stainless steel, and are secured together by any suitable technique, such as by welding. The kit 20, generally, is composed entirely of rods in the form of wires. The wires are made of stainless steel, or may be made of suitable Teflon-coated steel wires. Moreover, the wires or rods of the kit 20 are fixed together by any suitable technique, such as by welding.

The base 22 has a generally circular configuration and is adapted to fit inside a hollow cooking compartment 10A of the slow cooking vessel 10.

As shown in FIG. 2, the four depending leg portions 35 are each similar to one another. The leg portion 35 includes a generally U-shaped member 35A, which has each two upright, parallel leg portions 38 and 39 interconnected by a horizontal bight portion 40.

Figure 9:
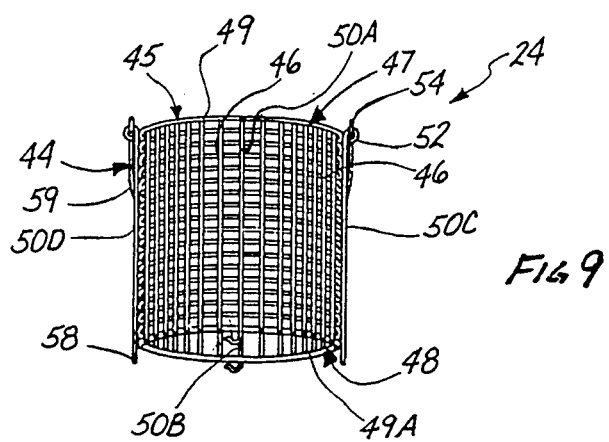
FIG. 9 is an enlarged pictorial view of the basket support attachment of FIG. 1.

Referring now to FIGS. 1, 2 and 9, the basket attachment 24 comprises a perforate, opened mesh wire cylindrical or tubular body 45, which is generally circular in cross section throughout its axial length. A pair of latch mechanisms 43 and 43A releasably secure the basket attachment 24 in an upright manner on top of the base 22. A swingably mounted handle or bail 44 bridges an opened upper end 48.

When detached from the base, the novel tubular body 45 has two opened upper and lower ends 47 and 48 respectively. The lower opened end 48 mates with the similarly shaped horizontal outer ring 37 of the base (FIG. 2).

The tubular body 45 is preferably formed of a unitary perforate sheet of wire mesh or metal fabric, having relatively small interstitial openings to enable the basket support attachment 24 to retain small comestible items therein, and yet allow the free flow of heated air therethrough. Both the upper and lower ends 47 and 48 are rigidified by means of a pair of like upper and lower respective circular bands or rings 49 and 49A, being of a substantially similar size to the outer base ring 37.

For the purpose of rigidifying the tubular body 45, as shown in FIG. 9, a set of four similar upright equally spaced-apart rods are affixed to and form a part of the body 45. The rods 50A and 50B are diametrically opposed to one another, and are affixed at their upper ends to the upper ring 49. At their lower ends, the rods 50A and 50B are affixed to the lower ring 49A.

The rod 50C will now be described in greater detail. The rod 50C terminates at its upper end in a loop 52 linked with an eye 54, to one end of a bail or handle 44.

The rod 50C at its lower end in a depending support member or leg 58, which extends below the lower ring 49A to help support the attachment 24 in an upright manner on a support surface, such as the surface S shown in FIG. 1.

When the basket support attachment 24 is affixed to the base 22, comestibles can be stored, washed or drained therein. The handle 44 facilitates the carrying of the comestibles within the basket attachment 24.

The combination of the base 22 and one of attachments, such as the attachment 24, to form a utensil assembly, such as the assembly 13 (FIG. 2), is releasably and securely fixed together by a pair of latch mechanisms generally indicated at 43 and 43A. The latch mechanisms are generally similar to one another, and are diametrically disposed opposite to one another.

Since both mechanisms are similar to one another, only the mechanism 43 will now be described in greater detail. As shown in FIG. 2, the latch mechanism 43 is a two-part mechanism. It includes a hook 60, which is the lower terminal end of the vertical rod 50A, and the horizontal rod portion 34 (FIG. 3) of the base 22. The rods 50A and 50B are affixed to and form a part of the body 45, in a similar manner as the rods 50C and 50D. The hook 60 is snapped into latching engagement with the outwardly extending rod portion 34 for connecting releasably the attachment 24 to the base 22.

As best seen in FIG. 2, the hook 60 includes a downwardly extending arcuate portion 63 bent at an angle of about 90° relative to a vertical portion 61 of the rod 50A to an upwardly extending arcuate portion 64, which is integrally connected to, and terminates in a distal end portion 65. In this manner, in order to snap the hook 60 into engagement with the rod portion 34, the attachment 24 is first positioned on top of the base 22, and then the body 45 is rotated about its vertical axis until both latch mechanisms engage.

The latch mechanism 43 engages when the upwardly extending hook portion 64 first engages the horizontal base rod portion 34 to cause the hook portion 64 to flex downwardly to allow the hook 60 to continue moving to the left as viewed in FIG. 2, until the hook 60 arrives at the illustrated latched position with the rod portion 34 disposed opposite the downwardly depending arcuate hook portion 63. In the illustrated latched position, the rod portion 34 is captured releasably between the vertical rod portion 61 and the upwardly extending arcuate portion 64.

In the latched position, even when the basket attachment is loaded with comestibles to be prepared, the attachment is securely affixed to the base 22. However, when it is desired to remove the attachment 22 from the base 22, the body 45 is rotated about its vertical axis in an opposite direction to cause the two latching mechanisms to disengage. In this regard, the arcuate portion 64 flexes downwardly to slip under the rod 34 to free the attachment from the base 22.

It should be understood that the hook portions of the latching mechanisms extend downwardly by the same distance as legs, such as the leg portion 58, of the rods 50C and 50D, so that the leg portions and the hooks are able to support the attachment 24 on the support surface S.

Also, it should now become apparent that the rod 34 extends radially outwardly beyond the base ring 37 by a sufficient amount to receive the hook 60.

Each one of the attachments shown in FIG. 1 includes a pair of hooks, similar to the hooks of the attachment 24, so that each one of the attachments latch onto the base 22 in a similar manner.

As shown in FIGS. 1 and 4, the meat holder support attachment 26 includes a generally circular rack 68 having a pair of concentric rings 69A and 69B and a plurality of spaced-apart upstanding pointed rods or elongated prongs 70 equally spaced about the periphery of the inner ring 69A. The concentric rings 69A and 69B are distally secured by a plurality of horizontal radial short branches or wires, such as the wire 71.

The meat holder support attachment 26 includes a pair of hooks, or latch mechanisms similar to that of the basket support attachment 24, and designated by the same numeral reference 43. The latch mechanism 43 includes a pair of like diametrically opposed latch members 60 downwardly depending from the rack 68, for engaging the rod 41 of the exposed portions 34 of the leg portions 35, in the same manner as detailed above.

The meat holder support attachment 26 includes a leg portions 72 and 72A and a pair of diametrically opposed latch hooks, such as the latch hook 73 for interengagement with the base rod portion 34, in a similar manner as the hook 60.

The upstanding pointed pins or prongs 70 are relatively short and are used to engage and hold a large comestible, such as a roast or the like. The pins 70, the rack 68, the latch mechanism 43 and the support rods 72 are preferably made of stainless steel, and are secured together by any suitable technique, such as by welding.

Referring now to FIGS. 1 and 7, there is shown the shish kebab support attachment 27, which is somewhat similar to the attachment 26. The reference numerals for the attachment 27 are increased by 100 over those designating similar elements in the meat holder support attachment 26.

The shish kebab support attachment 27 includes a rack 168 having a pair of concentric rings 169A and 169B, a pair of hooks 172 and 172A forming parts of a pair of latch mechanisms 143 and 143A, support shafts 172 and upstanding prongs 74.

The pair of concentric rings 169A and 169B are distally secured by means of radial branches or rods 171. The upstanding prongs 74 are angularly inclined slightly outwardly away from the central vertical axis of the rack 168. The prongs 74 are substantially longer than the pins 70, and are used to hold a wide variety of small comestibles 75, such as the shish kebab ingredients or the like, as indicated in broken lines in FIG. 7.

As shown in FIGS. 5 and 6, the upper portion of the poultry support attachments 28 and 29, fit inside the cavity of a chicken, or other poultry, enabling it to be positioned upright or in a slightly inclined position, respectfully. The attachment 28 of FIG. 5 supports a chicken or other poultry in an upright position within the cooking compartment of a small capacity slow cooking vessel (not shown), which are conventionally tall and narrow in configuration. The attachment 29 is generally similar to the attachment 28, except that the attachment 29 supports a chicken in a somewhat lower position, to enable it to be prepared conveniently within the larger capacity slow cooking vessel 10 (FIG. 1). The vessel 10 is shorter and wider in configuration.

Considering first the poultry support attachment 28, it includes a longitudinal wire frame 78 having a large base ring 80, and a small upper ring 82 interconnected by a cage member generally indicated at 84. It further comprises a pair of oppositely disposed support rods 272, and a pair of diametrically disposed latch hooks 260.

The cage member 84 comprises four spaced-apart arches 86, 87, 88 and 89. The first and third arches, 86 and 88 are similar to one another, and symmetrically disposed with respect to the central axis of the cage member 84, while the second and fourth arches, 87 and 89 are similar and symmetrically disposed with respect to the same central axis.

The first arch 86 is made of a continuous length of wire affixed to the outer periphery of the lower hoop 80 at point 90. It extends upwardly into an angularly inclined first rib 92. It further continues into a vertical upright second rib 94, and terminates upwardly into a U-shaped reversely bent portion 96. The first arch 86 is preferably affixed to the outer periphery of the upper ring 82 at points 95 and 97.

The bent portion 96 then extends downwardly into a vertical third rib 98 which is affixed to the outer periphery of the lower ring 80 at point 100. The third rib 98 then terminates into a latch hook 260, to engage latchingly the base 22, in a similar manner as described regarding the attachment 24.

The third arch 88 has a substantially similar configuration to the first arch 86 with a single exception. Instead of the third rib 98 terminating in a latch hook 260, it terminates in a support rod 272, in a manner to the attachment 24 of FIG. 9.

A small chicken can be fitted on the upper part of the cage member 84 as is indicated in broken lines at 276 in FIG. 5. The chicken however, could present a problem fitting onto the poultry support attachment 28 inside the cooking vessel 10, in that the chicken would be positioned too high above the bottom of a smaller capacity vessel.

As shown in FIG. 6, the poultry support attachment 29 can be used in the larger capacity slow cooking vessel 10 (FIG. 1), which is short and wide in its configuration. The numeral references in FIG. 6 for the attachment 29 are increased by 100 over those designating similar elements in the poultry support attachment 28 of FIG. 5.

The poultry support attachment 29 is generally similar to the first poultry support attachment 28, but it includes an angularly inclined cage member 184 fixed to a pair of parallel upper and lower rings 182 and 180, respectively, and disposed thereon in the same manner as the cage member 84 is disposed on the upper and lower rings 82 and 80. The cage 184 further comprises four loops or arches 186, 187, 188 and 189, generally corresponding to the arches 86, 87, 88 and 89.

The arch 186 is preferably made of a length of wire and is fixed to the lower ring 182 at a point 190. The loop 186 includes an inclined portion 192, extending at its lower end from the ring 180 at a sharp angle A relative to a horizontal plane. The portion 192 is integrally connected at its upper end to a lower end of a more steeply inclined portion 194, which is fixed at upper end to the upper ring 182 at a point 195. The portion 194 forms a more acute angle B relative to the horizontal plane.

The arch 186 at its uppermost point includes a U-shaped reversely bent portion 196, which is fixed to the upper ring 182 at point 197.

The reversely bent portion 196 is integrally connected to a steeply inclined portion 199, similar to the portion 194. The lower end of the portion 199 is integrally connected to the upper end of an inclined portion 198, which is generally similar to the portion 192. The portion 198 forms a sharp angle A relative to the horizontal plane. The portion 198 is fixed, such as by welding, to the lower ring 180 at a point 100, and terminates in a hook or latch member 360, which engages the base member 22, in a similar manner as the attachment 24 is secured thereto.

The arch 188 has a substantially similar configuration to the arch 186 with a single exception. Instead of the portion 198 terminating in the latch hook 360, the arch 188 terminates in a support member or rod 372 as described previously.

The method in accordance with the invention includes the steps of selecting a support attachment for fitting into the cooking vessel 10; positioning the support attachment over the base member 22; and then rotating the support attachment until the rod portion 34 engages rod portion 64 and finally rests opposite the arcuate radial part 63. The method for disassembling the inventive assembly comprises rotating the support attachment in an opposite direction; and then separating or removing the attachment from the base member 22.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A utensil assembly for cooking vessels used for preparing and supporting comestibles above the bottom of the cooking vessel and away from its inner walls, said assembly comprising:
   a single base supported above the bottom of the cooking vessel;
   a plurality of support attachments, each one of said support attachments being selectively detachably mountable on said base for supporting selected comestibles;
   latch means for locking each one of said support attachments independently to said base releasably and securely;
   said base including frame member having an outer ring and a plurality of spaced-apart arms extending radially outwardly integrally a short distance beyond said outer ring, for defining a part of said latch means;
   each one of said arms being formed of a single length of wire, and said part of said latch means including a plurality of relatively short rod-like portions; and
   said latch means further including a plurality of spaced-apart latches depending downwardly from each one of said support attachments for engaging releasably said rod-like portions of said frame member.

2. An assembly as described in claim 1, wherein said base comprises:
   a perforate grid member;
   said frame member bracing said grid member; and
   means for supporting said frame member above the bottom of the cooking vessel, said supporting means depending integrally from said frame member.

3. An assembly as described in claim 1, wherein said base includes supporting means having a plurality of U-shaped leg portions depending integrally from said arms and being bent transversely at right angle relative to said rod-like portions.

4. An assembly as described in claim 3, wherein said support attachment comprises a basket attachment, including a cylindrical body having two opened upper and lower ends, said lower opened end being sized to mate with said base.

5. An assembly as described in claim 4, wherein the cylindrical body is made of a unitary perforate sheet of metal fabric, having relatively small interstitial openings to retain small comestible items therein.

6. An assembly as described in claim 5, wherein said basket attachment further comprises means for carrying said assembly, said carrying means being disposed on said upper end.

7. An assembly as described in claim 1, wherein said latch means comprises a a pair of diametrically disposed latches with respect to the center of said support attachment, and downwardly depending therefrom for releasably engaging said short horizontal rod portions.

8. An assembly as described in claim 7, wherein each one of said latches comprises an arcuate part which depends downwardly from said support attachment, and which terminates in a bowed portion for securely holding one of said short horizontal rod portions.

9. A utensil assembly for cooking vessels used for preparing and supporting comestibles above the bottom of the cooking vessel and away from its inner walls, said assembly comprising:

a base support above the bottom of the cooking vessel;

a support attachment detachably mountable on said base for supporting selected comestibles;

latch means for locking said support attachment to said base releasably and securely, said locking means having one part disposed on said support attachment, and another part disposed on said base;

wherein said support attachment comprises a generally planar circular rack, said rack being sized to mate with said base and comprising a pair of concentric base rings distally secured by a plurality of radial substantially short branches.

10. An assembly as described in claim 9, wherein said support attachment includes a meat holder attachment, comprising a plurality of spaced-apart generally upstanding pins disposed along the periphery of the inner base ring.

11. An assembly as described in claim 10, wherein said upstanding pins are substantially parallel and short.

12. An assembly as described in claim 9, whererin said support attachment includes a shish kebab attachment, and further comprises a plurality of upstanding prongs angularly reclined from the central axis of said rack.

13. An assembly according to claim 9, wherein said base includes a frame member and a series of spaced-apart concentric rings of varying diameters secured atop said frame member.

14. An assembly according to claim 13, wherein said frame member is made of at least one length of wire having a closed loop configuration.

15. An assembly according to claim 9, further including a basket attachment which is interchangeable with said planar circular rack and, which is adapted to engage releasably said base.

16. An assembly according to claim 15, wherein said basklet attachment includes an elongated upstanding cylindrical body made of a plurality of lengths of wire.

17. A utensil assembly for cooking vessels used for preparing and supporting comestibles above the bottom of the cooking vessel and away from its inner walls, said assembly comprising:

a base supported above the bottom of the cooking vessel;

a support attachment detachably mountable on said base for supporting selected comestibles;

latch means for locking said support attachment to said base releasably and securely, said locking means having one part disposed on said support attachment, and another part disposed on said base;

wherein said support attachment further comprises a poultry support attachment having a base ring and a relatively smaller upper ring said base ring and upper rings being interconnected by a cage member, for fitting inside the cavity of a poultry.

18. An assembly as described in claim 17, wherein said cage member comprises a plurality of spaced-apart loops disposed along the outer peripheries of said base ring and upper ring.

19. An assembly as described in claim 18, wherein each one of said loops includes a continuous length of wire.

20. An assembly as described in claim 19, wherein a portion of each one of said loops forms a generally U-shaped bay portion above said upper ring.

21. An assembly as described in claim 19, wherein said cage member is disposed in an upright position, and wherein said base ring and said upper ring lie in two substantially horizontal parallel planes.

22. An assembly as described in claim 19, wherein said cage member is disposed in a reclined position, and wherein said base ring and said upper ring lie in two angularly disposed planes.

23. A cooking utensil kit comprising:

a base; and a plurality of interchangeable support attachments comprising:

a basket support attachment, having a cylindrical body made of a unitary perforate sheet of metal fabric, having relatively small interstitial openings to retain small comestible items therein, said cylindrical body comprising an upper and lower opened ends, said lower end being sized to mate with said base;

a meat holder support attachment having a generally planar circular rack, said circular rack being sized to mate with said base, and a plurality of concentric rings distally secured by a plurality of radial substantially short branches, said branches being interposed between and connected to, said concentric rings;

a shish kebab support attachment having a generally planar circular rack dimensioned to mate with said base; a plurality of concentric rings distally secured by a plurality of radial substantially short branches; and a plurality of upstanding prongs slightly angularly reclined from the central axis of said base;

a first poultry support attachment comprising a lower hoop and a relatively smaller upper hoop, said upper and lower hoops being interconnected by a cage member, wherein said cage member comprises a plurality of spaced-apart substantially upwardly extending arches disposed along the outer peripheries of said lower and upper hoops, and wherein said cage member is disposed in an upright position; and a second poultry support attachment comprising a lower hoop and a relatively smaller upper hoop, said upper and lower hoops being interconnected by a cage member, wherein said cage member comprises a plurality of spaced-aprt substantially angularly upwardly extending arches disposed along the outer peripheries of said lower and upper hoops, and wherein said cage member is disposed in a reclined position with respect to a hypothetical vertical plane passing through the center of said lower hoop.

24. A method for using a cooking utensil kit having a base and a plurality of interchangeable support attachments, comprising the steps of:
- selecting one of said support attachments for fitting inside the cooking vessel;
- positioning said selected support attachment over the base;
- rotating said support attachment until said support attachment engages said base and latches therewith;
- subsequently rotating said support attachment in an opposite direction; and removing said support attachment from said base.

25. A cooking utensil kit comprising:
- a base; and
- a plurality of interchangeable support attachments comprising:
  - a basket support attachment, having a cylindrical body made of a plurality of sections of wires defining relatively small openings to retain small comestible items therein, said cylindrical body including an upper and lower opened ends, said lower end being sized to mate with said base; and
  - a meat holder support attachment, having a generally planar circular rack, said circular rack being sized to mate with said base, and a plurality of spaced-apart substantially short branches being connected to said rack.

* * * * *

UNITED STATES PATENT AND TRADEMARK OFFICE
CERTIFICATE OF CORRECTION

PATENT NO. : 4,735,135

DATED : April 5, 1988

INVENTOR(S) : Lynn F. Walker

It is certified that error appears in the above-identified patent and that said Letters Patent are hereby corrected as shown below:

Column 1, Lines 34 and 35: "traditronal" should read --traditional--.
Column 3, Line 28: "attachment holding" should read --attachment shown holding--.
Column 5, Line 25: "relative to" should read --relative from--.
Column 9, Line 26: "support" should read --supported--.
Column 11, Line 2: "spaced-aprt" should read --spaced-apart--.
Column 9, Line 63: "basklet" should read --basket--.
Column 9, Line 11: "a a" should read --a--.
Column 9, Line 46: "whererin" should read --wherein--.

Signed and Sealed this

Sixth Day of September, 1988

Attest:

DONALD J. QUIGG

*Attesting Officer*  *Commissioner of Patents and Trademarks*